United States Patent
Zhou et al.

(10) Patent No.: US 11,403,318 B2
(45) Date of Patent: Aug. 2, 2022

(54) APPARATUS AND METHOD FOR MANAGING STORAGE OF A PRIMARY DATABASE AND A REPLICA DATABASE

(71) Applicant: Futurewei Technologies, Inc., Plano, TX (US)

(72) Inventors: Qingqing Zhou, Santa Clara, CA (US); Yang Sun, Palo Alto, CA (US); Guogen Zhang, San Jose, CA (US)

(73) Assignee: FutureWei Technologies, Inc., Addison, TX (US)

(*) Notice: Subject to any disclaimer, the term of this patent is extended or adjusted under 35 U.S.C. 154(b) by 303 days.

(21) Appl. No.: 14/872,811

(22) Filed: Oct. 1, 2015

(65) Prior Publication Data

US 2017/0097972 A1   Apr. 6, 2017

(51) Int. Cl.
*G06F 16/27* (2019.01)
*G06F 16/25* (2019.01)

(52) U.S. Cl.
CPC ........... *G06F 16/27* (2019.01); *G06F 16/258* (2019.01)

(58) Field of Classification Search
CPC ......... G06F 17/30315; G06F 17/30312; G06F 17/30575; G06F 17/30581; G06F 17/30595; G06F 17/30336; G06F 17/30339; G06F 17/30345; G06F 17/30569; G06F 17/30185; G06F 17/30292; G06F 17/30578; G06F 2201/855; G06F 17/30289; G06F 17/30501; G06F 17/30507; G06F 17/30946;

(Continued)

(56) References Cited

U.S. PATENT DOCUMENTS 5,884,325 A * 3/1999 Bauer ................. G06F 16/273
                                                    705/40
7,953,749 B2   5/2011 Bipul et al.
(Continued)

FOREIGN PATENT DOCUMENTS

CN   102999519 A   3/2013
CN   103177058 A   6/2013
(Continued)

OTHER PUBLICATIONS

Ramamurthy et al., "A Case for Fractured Mirrors", Department of Computer Sciences, University of Wisconsin-Madison, 12 pages.
(Continued)

*Primary Examiner* — Alford W Kindred
*Assistant Examiner* — Cecile H Vo (57) ABSTRACT

System and method embodiments are provided for using different storage formats for a primary database and its replicas in a database managed replication (DMR) system. As such, the advantages of both formats can be combined with suitable design complexity and implementation. In an embodiment, data is arranged in a sequence of rows and stored in a first storage format at the primary database. The data arranged in the sequence of rows is also stored in a second storage format at the replica database. The sequence of rows is determined according to the first storage format or the second storage format. The first storage format is a row store (RS) and the second storage format is a column store (CS), or vice versa. In an embodiment, the sequence of rows is determined to improve compression efficiency at the CS.

19 Claims, 5 Drawing Sheets

(58) Field of Classification Search
CPC ......... G06F 17/30318; G06F 17/30321; G06F 17/30587; G06F 16/221; G06F 3/065; G06F 16/22; G06F 16/27; G06F 16/23; G06F 16/245; G06F 16/258; G06F 16/275; G06F 16/284; G06F 16/958; G06F 16/2455; G06F 16/00; G06F 16/128; G06F 16/1805; G06F 16/20; G06F 16/211; G06F 16/2282; G06F 16/2453; G06F 16/273; G06F 16/254; G06F 16/86; G06F 16/901; G06F 16/2228; G06F 16/24; G06F 16/28; G06F 16/81; G06F 16/24542; G06F 16/2219
USPC ................. 707/693, 803, E17.002, E17.005, 707/E17.014, E17.037, 626, 648, 714, 707/741, 752, 753, 756, 796, 999.005, 707/999.102, 999.103, E17.017, E17.074, 707/769, 610, 201, 718
See application file for complete search history.

(56) References Cited

U.S. PATENT DOCUMENTS

| | | | | |
|---|---|---|---|---|
| 8,032,491 | B1* | 10/2011 | Appellof | G06F 11/1458 707/649 |
| 9,342,557 | B2* | 5/2016 | Kornacker | G06F 16/2453 |
| 9,460,147 | B1* | 10/2016 | Chang | G06F 16/13 |
| 9,477,731 | B2* | 10/2016 | Kornacker | G06F 16/24534 |
| 9,607,073 | B2* | 3/2017 | Schechter | G06F 16/254 |
| 9,766,987 | B2* | 9/2017 | Kumarasamy | G06F 11/1469 |
| 9,811,575 | B2* | 11/2017 | Christian | G06F 16/258 |
| 2003/0158852 | A1 | 8/2003 | Zoltan | |
| 2008/0168071 | A1 | 7/2008 | Dykes et al. | |
| 2010/0325094 | A1 | 12/2010 | Yang et al. | |
| 2012/0173515 | A1* | 7/2012 | Jeong | G06F 16/24557 707/765 |
| 2014/0114952 | A1* | 4/2014 | Robinson | G06F 16/24532 707/718 |
| 2015/0026154 | A1* | 1/2015 | Jeong | G06F 16/20 707/718 |
| 2015/0074151 | A1* | 3/2015 | Chaiken | G06F 16/27 707/803 |
| 2015/0088822 | A1 | 3/2015 | Raja et al. | |
| 2015/0095286 | A1 | 4/2015 | Spyker | |
| 2017/0097977 | A1 | 4/2017 | Yoon et al. | |

FOREIGN PATENT DOCUMENTS

| | | |
|---|---|---|
| CN | 103440245 A | 12/2013 |
| CN | 104462169 A | 3/2015 |
| EP | 1283486 A2 | 2/2003 |
| EP | 2608072 A1 | 6/2013 |
| EP | 2889787 A2 | 7/2015 |

OTHER PUBLICATIONS

Kanade, A., et al., "Choosing Right Database System: Row or Column-Store", 2013 International Conference on Information Communication and Embedded Systems (ICICES), Feb. 21-22, 2013, 5 Pages, Chennai, India.

Mapreduce, "Research and Implementation of MapReduce-Based Heuristic Multi-Join Optimization under Hybrid Storage", www.cnki.net, retrieved on Mar. 26, 2021, 2 Pages.

* cited by examiner

APPARATUS AND METHOD FOR MANAGING STORAGE OF A PRIMARY DATABASE AND A REPLICA DATABASE

TECHNICAL FIELD

The present invention relates to database processing, and, in particular embodiments, to managing primary and replica databases using different storage formats.

BACKGROUND

A database server provides data redundancy by database managed replication (DMR). In DMR, a primary database (referred to as primary) is replicated into one or more replica databases (referred to as replicas) that serve as backup databases for the primary. The database replication provides data redundancy. The synchronization between the primary and its replica(s) is carried by the database management system (DBMS). The DMR provides efficient data replication, where the physical changes are propagated directly from the primary to replicas via physical log transfer, also referred to as log shipping. Replicas can apply logs directly to the physical storage. The DMR also allows fast fail over and robust ACID (Atomicity, Consistency, Isolation, and Durability) compliant redundancy. Via log replaying, replicas keep data fairly close to the latest data in the primary. This enables faster fail over than disk based solutions. The log replaying protocol is ACID compliant. In order to utilize physical logs, the DMR primary and replica(s) use the same storage format, such as a row store (RS) format or a column store (CS) format. RS format based storage is suitable for point style queries, while CS format is suitable for analytical style complex queries. Since many workloads are mixed with point and analytical queries, choosing between one of the two formats can be challenging. On the other hand, using both formats for the primary and replicas increases storage cost. There is a need for a scheme that can exploit the advantages of both formats for storing the primary and replicas without increasing storage cost, e.g., instead of using both formats for the primary and replica.

SUMMARY OF THE INVENTION

In accordance with an embodiment, a method is implemented at a computation node of a database system for managing storage of a primary database and a replica database. The method includes storing data arranged in a sequence of rows in a first storage format at the primary database, and storing the data arranged in the sequence of rows in a second storage format at the replica database. The sequence of rows is determined according to one of the first storage format and the second storage format.

In accordance with another embodiment, a method is implemented at a computation node of a database system for managing storage of a primary database and a replica database. The method includes compressing a plurality of columns in a plurality of rows of a data table into a compression unit (CU) for a column store (CS). The rows are ordered in a sequence suitable for the CS. The method further includes inserting the rows of the CU into a heap file for a row store (RS). The rows are ordered in the RS in the sequence of the CS.

In accordance with yet another embodiment, a network component for managing storage of a primary database and a replica database comprises at least one processor and a non-transitory computer readable storage medium storing programming for execution by the at least one processor. The programming includes instructions to store data arranged in a sequence of rows in a first storage format at the primary database, and store the data arranged in the sequence of rows in a second storage format at the replica database. The sequence of rows is determined according to one of the first storage format and the second storage format.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided herein for using different storage formats for a primary database (or primary for short) and its replicas in a DMR system. As such, the advantages of both formats can be combined with suitable design complexity and implementation. For instance, the primary and replica can be in RS and CS formats respectively, or in CS and RS formats respectively. A database server employing this scheme is able to support mixed query workloads for better performance. For example, a query can span to multiple processing nodes using the more suitable storage format to lower processing cost. The scheme also increases storage efficiency, for example as the CS format is known to have better storage efficiency than the RS format. The embodiments include the design and algorithms to enable synchronization between the primary and replica. Although the embodiments discuss CS and RS storage formats, the concepts herein can be extended to heaps, heap with indices, covered indices or other formats.

Figure 1A:
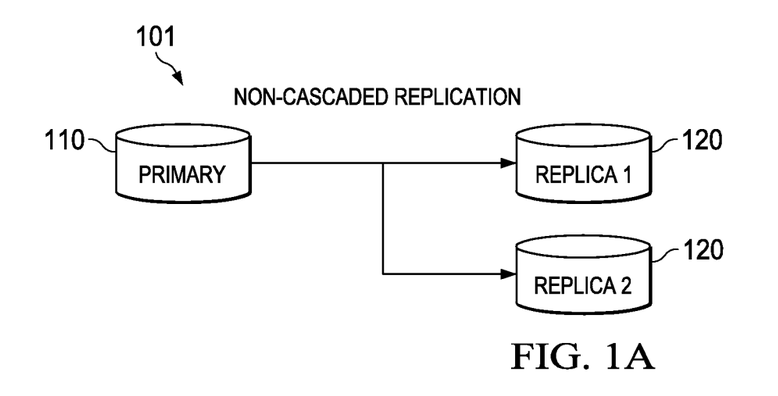
FIGS. 1A-1C show examples of database replication architectures.
Figure 1B:
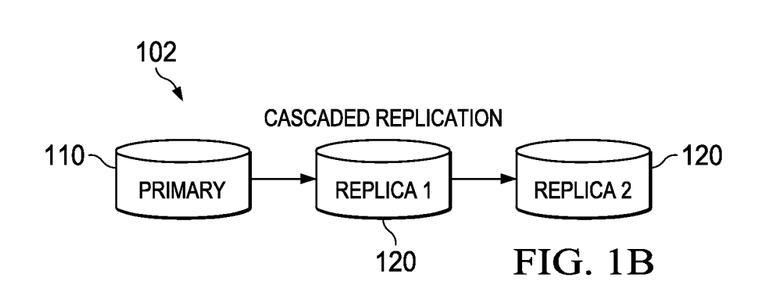
Figure 1C:
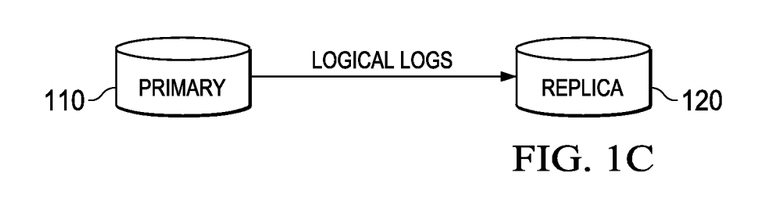

FIGS. 1A-1C show examples of database replication architectures. FIG. 1A shows a non-cascaded replication architecture 101 where a primary database 110 is replicated independently or directly to one or more replicas 120. FIG. 1B shows a cascaded replication architecture 102, where the primary 110 is replicated to a first primary 120, which in turn is replicated to a second primary 120, and so forth. FIG. 1C shows a logical view of both architectures. Both architectures can be represented as a mapping (replication) between a pairing of the primary 110 and one or more replicas 120, whether directly in a non-cascaded manner or through a cascade of replicas 120. The primary and replica each hold a copy of a database.

Figure 2:
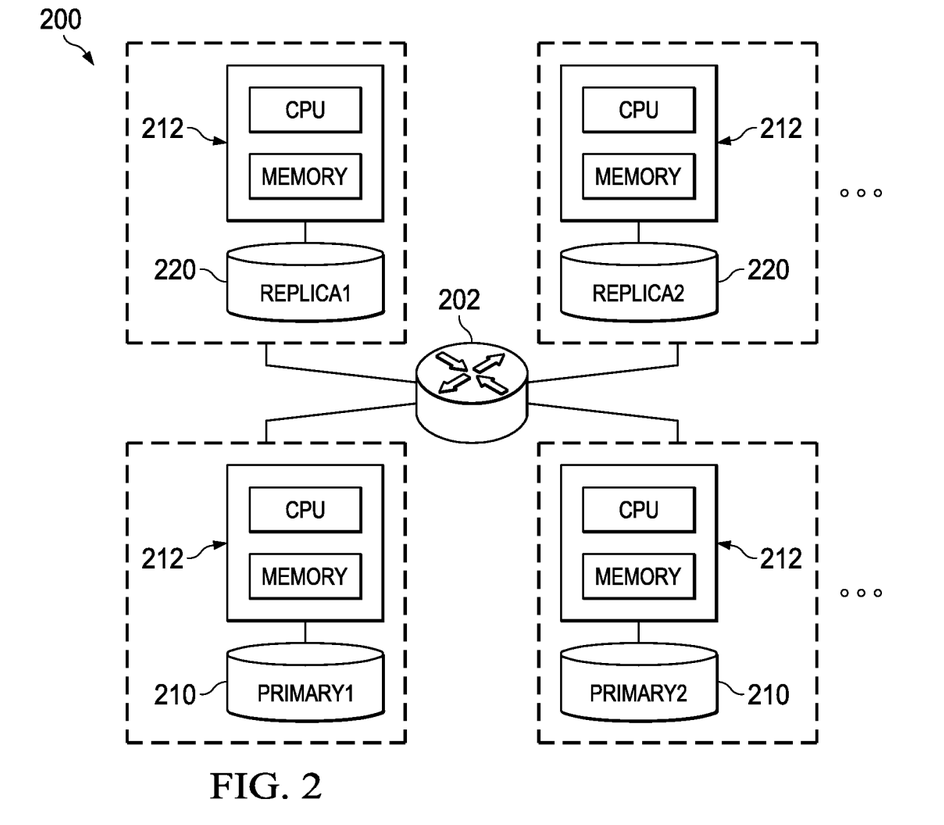
FIG. 2 shows an example of a shared nothing (SN) database cluster with a primary and a replica.

FIG. 2 shows an example of a shared nothing (SN) database cluster 200 with pairs of primary 210 and replica 220. The SN database cluster 200 is handled by applying any of the replication architectures above for each participating processing node 212, and using distributed query processing. The nodes 212 are processing nodes, e.g., database servers, with CPU and memory. Each primary 210 and replica 220 is handled by a corresponding node 212. In this example, the cluster 200 includes a first pair of Primary1 and Replica1, and a second pair of Primary2 and Replica2, each handled by a processing node 212. The processing nodes 212 can be connected through a switch 202 or a network. Cross-node and cost-based query planning can be implemented in a query optimizer or a database engine. The query optimizer may be part of the database engine, which is a program for managing database data, e.g., including performing query data, write data, replicate data, and/or other functions. The data statistics can be collected and saved by the nodes 212 of each primary and replica. The data statistics of each primary are in different format than the data statistics of its replica. Therefore, the node 212 for each replica also reports its data statistics to the node 212 of its corresponding primary. The data statistics of each primary are also replicated to its replica. Thus, when there is a failover of a primary, its replica would have collected the primary's statistics during a previous replication, and vice versa.

An example query that can be processed in the SN database cluster 200 is as follows:

```
SELECT T2.v4, COUNT(*) FROM T1, T2
    ON T1.v1 = T2.v1 WHERE T1.v2 = 136 and T2.v3>27
    GROUP BY T2.v4;
```

Conventionally, a plan executing for the query uses either RS or CS formats as follows. For example, the plan in Row Store (RS) includes:

```
HashAgg (sum)
    GATHER
        HashAgg(count)
            HashJoin (T1.v1=T2.v1)
                IndexScan T1.v2 = 136
                RowTableScan T2.v3 > 27 + BF /* bloom filter */
```

For the Column store (CS), the plan includes:

```
HashAgg (sum)
    GATHER
        HashAgg(count)
            HashJoin (T1.v1=T2.v1)
                CStoreScan T1.v2=136)
                CStoreScan T2.v3>27 + BF /* bloom filter */
```

According to an embodiment herein, the plan is generated instead using both RS and CS formats for the primary and replica, as follows:

```
HashAgg (sum)
    GATHER
        HashAgg(count)
            HashJoin (T1.v1=T2.v1)
                IndexSCAN T1.v2 = 136
                REDISTRIBUTE
                    CStoreScan T2.v3 > 27 + BF
```

The SN cluster-distributed query processing supports a cross-node REDISTRIBUTE iterator function, which ships data trunks from one processing node 212 (or database 210) to the other. The REDISTRIBUTE iterator needs to ship data from a replica (or primary) to the corresponding primary (or replica). This can be supported in the SN cluster database 200.

Changes can be propagated from the primary to the corresponding replica(s) via synchronization. Existing RS replication technology can be leveraged to handle catalog table changes imposed by Data Definition Language (DDL), Data Control Language (DCL), and at least some Data Manipulation Language (DMLs), as both RS and CS can use a row format to save and coordinate the catalog data. The data changes that are addressed using RS replication involve one side in RS format (e.g., at the primary or replica) and the other side in CS format (e.g., at the replica or primary). The changes may include INSERT and DELETE operations, while the UPDATE operation can be deduced from those two.

According to an embodiment, to enable the synchronization of changes between the primary and replica(s) with RS format on one side and CS format on the other, the RS and CS rows are kept aligned by a sequence. The sequence is a unique number identifying a row, and is incremented by one per each next row. The sequence number does not need to be globally unique. It is sufficient for the sequence to be unique within a portion of the table or the database, such as a partition of the table and the database. The sequence is assigned and fixed at INSERT time. The DELETE operation does not affect or change the sequence number of rows. With the sequence approach, the CS and RS do not require extra key or storage to map each row between them. The same sequence identifying the row is kept in both formats.

Figure 3:
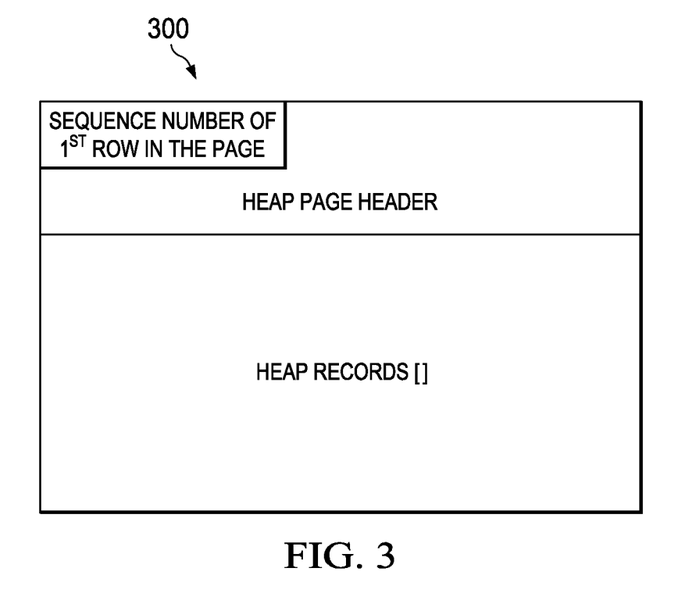
FIG. 3 shows an embodiment of a heap file format.

In an embodiment, the RS format includes heap pages and an affiliated index structure comprising a set of pointers for the heap pages. A heap page is a file, for instance of a fixed length, comprising a sequence of rows (referred to as heap records). The sequence number of the first row in the heap page is recorded in the heap page header, as shown in FIG. 3. The use of the sequence of the first row in each heap page and the affiliated index structure allows retrieving any row in the heap pages. The affiliated index structure can be a B+-tree, a hash index or any other suitable index type, where each entry in the index points to a heap page or a group of heap pages.

The affiliated index structure serves as a sequence map to locate the sequence numbers in the heap page headers. This accelerates locating a row (in heap pages) by its sequence number. When a heap page is retrieved (using the affiliated index structure) with its starting row sequence number, any subsequent row (heap record) in the same heap page can be retrieved, e.g., implicitly according to its order in the page. For example, for a page with a sequence number 3456, the first row is 3456, the second is 3457, and the third is 3458, and so on. The sequence map (the affiliated index structure) can use several bytes to record the starting row sequence number of each heap page.

Figure 4:
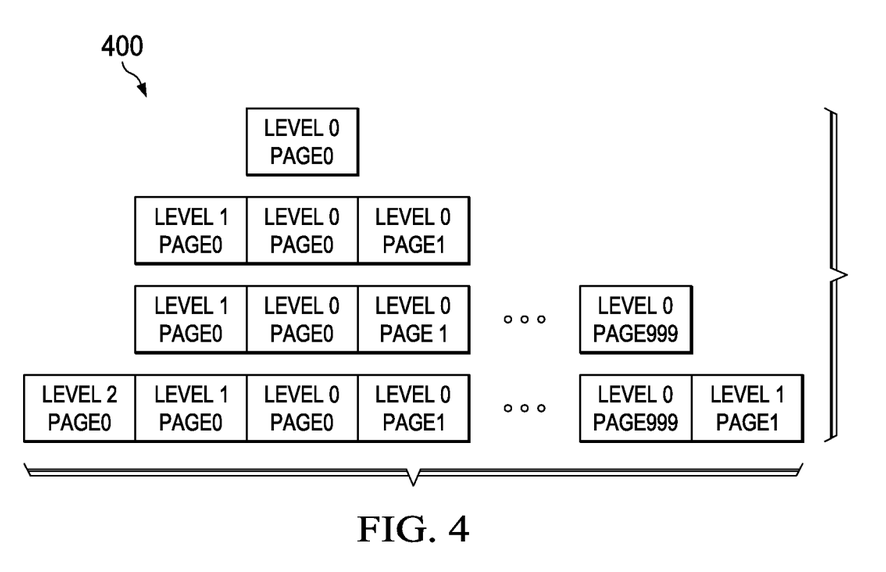
FIG. 4 shows an embodiment of a sequence map.

FIG. 4 shows an embodiment of a sequence map and shows how the sequence map may grow in size upon inserting rows into a table. The sequence map is used to locate a heap page with a starting row sequence number. Initially, the map is set at an initial level (level 0). A first map page or entry (level 0-page 0) is added for a first group of a predetermined number of heap pages, for example first 2000 heap pages. The map page or entry includes the starting row sequence number of the first heap page in the group and a pointer to locate the heap pages. The map page can use about 4 bytes, for example, to record the starting row sequence number. When a next heap page in a next second group of 2000 heap pages is added, the map is upgraded to a first level (level 1) by adding a map page or entry (level 1-page 0) indicating the first level. Additionally, a new map page or entry (level 0-page 1) corresponding to the added next heap page in the next group is added to the map. This added map page or entry includes the starting row sequence number of the first heap page in the second group of 2000 heap pages and a pointer to locate the corresponding heap pages. The map can grow by adding similarly more level 0 pages (level 0-page 2, level 0-page 3, . . . ) for each next group of 2000 heap pages, until reaching a predetermined maximum number of groups allowed per level, such as 1000 groups (0 to 999) per level. As such, the level 1 can accommodate about 1000×2000 heap pages. The level 1-page 0 map page or entry includes pointers to all level 0 pages in the map. The level 1-page 0 map page can use about 8 bytes, for example, to record the starting row sequence number of each of the level 0 pages.

When a next heap page is added beyond that maximum number of heap pages for level 1, the map is upgraded to a next level (level 2) by adding a map page or entry (level 2, page 0) indicating the next level. A next map page or entry (level 1 and page 1) is also added for the next added heap page. This map page or entry includes the starting row sequence number of the first heap page in the group beyond the 1000×2000 heap pages, and a pointer to locate the heap pages. The level 2-page 0 map page includes pointers to all level 0 and level 1 pages in the map. Following the same logic, the map can continue growing in pages and levels to accommodate more heap pages for more inserted rows.

In an embodiment, the CS format comprises a sequence of compression units (CUs), which each stores a fixed number (e.g., 100,000) of values or table entries, e.g., corresponding to the number of columns in a data table. Each CU has a CU descriptor persisted, for instance as metadata, in the RS and can share the same transactional protection in the RS. For example, if the RS uses multi-version concurrency control (MVCC), then MVCC is applied for the CU descriptor. Or, if the RS is lock based, then the stored CU descriptor is locked based. The CU descriptor includes a PointerToCU field pointing to its CU storage. The CU descriptor can include a DeletionBitmap field for flagging deleted rows where each bit represents a row in the CU. The Deletion-Bitmap field can be Run-Length Encoding (RLE) compressed. The CU descriptor can also include a NumberOfRows field indicating the number of rows in the CU. This value is fixed upon creating the CU.

To allow efficient compression (e.g., a better compression ratio) in the CS format, row ordering in the CS format may have higher priority to row ordering in the RS format. Therefore, the RS rows are ordered to match the ordering of the CS rows. In order to keep the sequence aligned for both formats, care should be taken that the INSERT and DELETE operations do not introduce sequence misalignment between the two formats.

In an example, the primary is stored in RS and the replica is stored in CS. The INSERT operation includes an insertion part and a scan part. The insertion part's function is to insert rows, and the scan part's function is to generate rows. A simple form of scan is reading from a comma-separated value (CSV) file or a foreign table. A more complex form of scan may involve joining with multiple tables. The query processor can generate the scan part by invoking query execution in both primary and replica.

An example query with the INSERT operation is as follows:

```
INSERT INTO U SELECT T2.v4, COUNT(*) FROM T1, T2
   ON T1.v1 = T2.v1 WHERE T1.v2 = 136 and T2.v3>27
   GROUP BY T2.v4;
```

The plan generated for the query is as follows:

```
INSERT (N)                      // insertion part
   ...                          // plan below is scan part
   HashJoin (T1.v1=T2.v1)
      IndexSCAN T1.v2 = 136
      REDISTRIBUTE
         CStoreScan T2.v3 > 27 + BF
```

The insertion part is thus generated by the query executor as follows:
/* Primary is RS and replica is CS */
   RS Insertion (INPUT: rows in raw format)
      1. /* Loop to build CU first */
         for (;;)
         Compress the inputs into columnar format thus creating a CU;
         if (CU.size==0) break;
         /* No current insert but delete/read is ok. Send the CU to replica. */
      2. Set startSequence=global maintained insertion sequence;
         Ship <startSequence, #rows, CU> (referred to as shipment) to replica;
      3. /* Concurrently, primary builds RS, and replica writes CU */
         Concurrently do:
         In Primary: follows CU's row ordering, insert into RS. Wait for replica ACK;
         In Replica: receive the shipment and insert into CS. Send ACK;
      4. /* Error handling */
         If anything fails in the middle, abort the transaction.
      5. /* Primary local commits and post-commits */
         When ACK is received, primary commits transaction locally.
         global maintained insertion sequence+=#rows;
   Further, the table of data processed above can be locked, e.g., prior to step 2, and released when the steps are completed. In another implementation, the CS and RS are put in a critical section which allows no concurrent insert operation but allows concurrent read or delete. For relatively small insertion, the lock down time is brief. For batch insertion, the RS format can utilize parallel insertion implementation to saturate system resource. Therefore, allowing parallel insertion is not needed. This insertion algorithm keeps the sequence aligned.

The DELETE operation can be treated similar to the INSERT operation. The DELETE operation includes a deletion part and a scan part. By executing the scan part of the deletion query, which may span both primary and replica, a list of sequences is to be deleted. For RS format, after identifying a qualified record, the heap page header is examined to obtain the sequence number. For CS, this is done by accumulating the CU descriptor's NumberOfRows field.

According to the RS format's MVCC rules, deleting a row is achieved by setting one or more flags in the record's header part without actually removing it from storage. In CS, deletion is done by setting the corresponding bit in the CU descriptor's DeletionBitmap field. The sequence is still maintained if in-place updates (which are updates that overwrite the target row in the same storage) are not performed. When the primary is CS and the replica is RS, the INSERT and DELETE operations are handled in a similar manner to the case of a primary RS and a replica CS described above. In the case of a primary CS and a replica RS, during INSERT, the primary node first builds the CS then ships the CS to the replica side in order to build the RS for the replica in alignment with the sequence at the CS.

Figure 5:
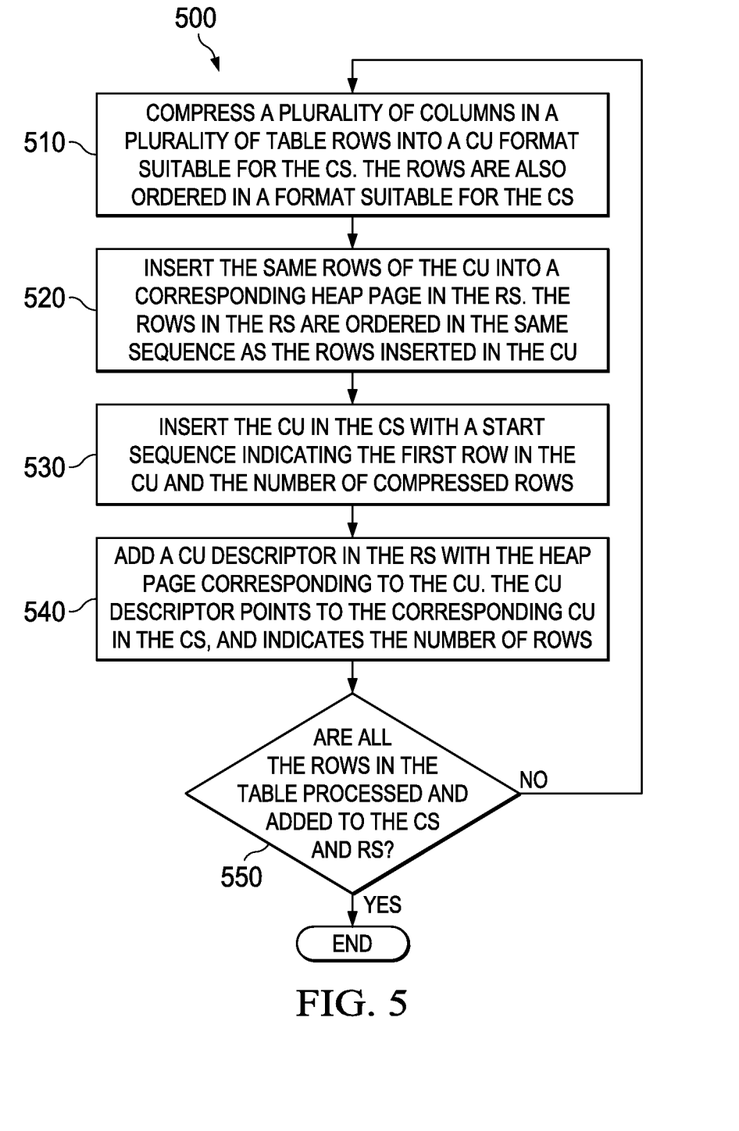
FIG. 5 shows a flowchart of an embodiment of a method for managing primary and replica databases using different storage formats.

FIG. 5 shows a flowchart of an embodiment of a method 500 for managing primary and replica databases using different storage formats. Specifically, a RS is used for the primary and a CS is used for the replica. The method 500 is implemented, e.g., by a database engine or DBMS, to establish a RS in the primary, and a CS in the replica. At step 510, a plurality of columns in a table of data are compressed into a corresponding CU format suitable for the CS. The columns are obtained from a plurality of rows (e.g., consecutive rows) in the table. The rows are ordered in a format suitable for the CS, for instance to improve the compression ratio or efficiency in the CS. At step 520, the same rows of the CU are inserted into a corresponding heap page (or file) in the RS. The rows in the RS are ordered in the same sequence of the rows inserted in the CU. At step 530, the CU is inserted in the CS with a start sequence indicating the first row in the CU and the number of compressed rows. At step 540, a CU descriptor is added to the CS with a pointer corresponding to the CU. The CU descriptor can be in RS format and points to the corresponding CU in the CS, and indicates the number of rows. The steps 510 to 540 are repeated until all the rows in the table are processed and added to the CS and RS. A similar method can be implemented using CS in the primary and RS in the replica. In this case, the RS can be added for the replica after committing the CS to the primary.

Figure 6:
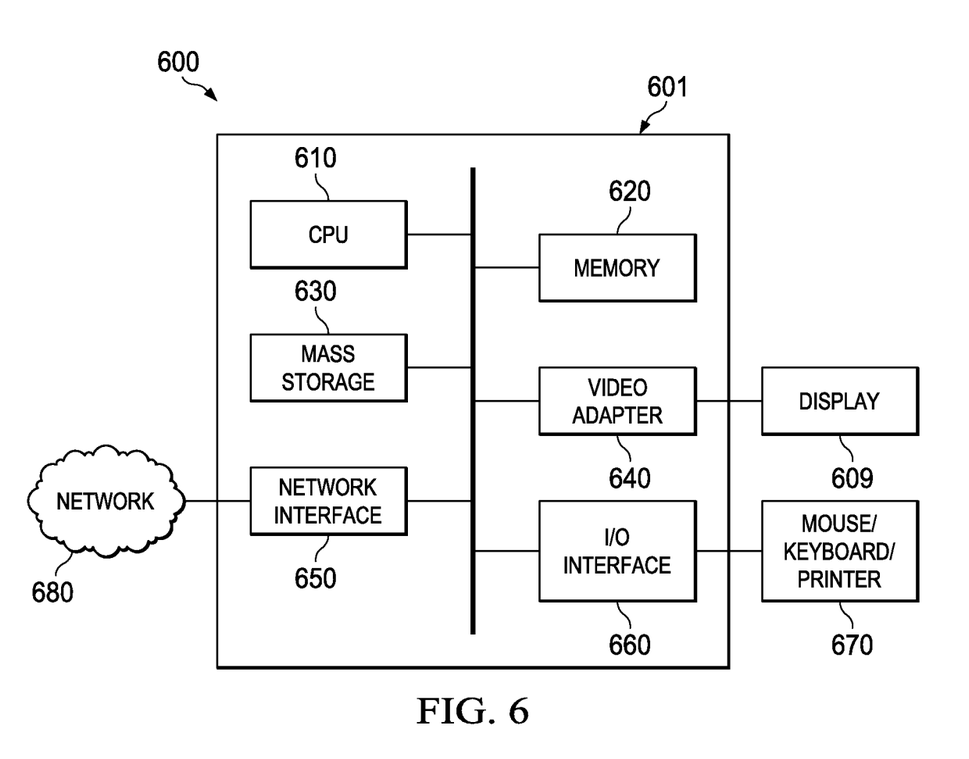
FIG. 6 is a diagram of a processing system that can be used to implement various embodiments.

FIG. 6 is a block diagram of a processing system 600 that can be used to implement various embodiments including the methods above. For instance, the processing system 600 can be part of a DMR or database replication architecture as described above. In another scenario, the processing system 600 can be a computation node or a group of computation nodes, e.g., database servers, in the system. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an I/O interface 660 connected to a bus. The bus may be one or more of any type of several bus architectures including a memory bus or memory controller, a peripheral bus, a video bus, or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The video adapter 640 and the I/O interface 660 provide interfaces to couple external input and output devices to the processing unit. As illustrated, examples of input and output devices include a display 690 coupled to the video adapter 640 and any combination of mouse/keyboard/printer 670 coupled to the I/O interface 660. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, at a computation node of a database system, for managing storage of a primary database and a replica database, the method comprising:
storing, by the computation node, data in a first storage format at the primary database of a first processing node, the first processing node comprising a first central processing unit (CPU) and a first memory, the primary database being queryable using database queries, the first storage format being one of a row store (RS) storage format or a column store (CS) storage format, and the data being arranged in a first sequence of rows at the primary database;
storing, by the computation node, the data in a second storage format at the replica database of a second processing node separate from the first processing node, the second processing node comprising a second CPU and a second memory, the replica database being queryable using database queries, the second storage format being the other one of the RS storage format or the CS storage format, the data being arranged in a second sequence of rows at the replica database, wherein the data is stored in the first sequence of rows in the first storage format at the primary database and in the second sequence of rows in the second storage format at the replica database such that the primary database and the replica database each store a copy of the data in different storage formats that is queryable;
synchronizing, by the computation node, the data between the primary database and the replica database by aligning the first sequence of rows with the second sequence of rows according to sequence numbers assigned to the first sequence of rows and the second sequence of rows;
generating, by the computation node, a query plan to execute a single database query on the data according to a type of the single database query, with the query plan comprising a first query operation to be executed according to the first storage format and a second query operation to be executed according to the second storage format; and
executing, by the computation node, the single database query on the data according to the query plan by accessing the copy of the data at the primary database of the first processing node according to the first storage format to execute the first query operation, and accessing the copy of the data at the replica database of the second processing node according to the second storage format to execute the second query operation.

2. The method of claim 1, wherein the first storage format is the RS storage format and the second storage format is the CS storage format; with the method further comprising:
before storing the data, determining a sequence of rows of the data in order to improve compression efficiency at the CS storage format.

3. The method of claim 1, wherein:
storing the data in the primary database includes storing each group of rows in a plurality of groups of rows in the data into a heap file of a fixed length; and
storing the data in the replica database includes storing a fixed number of columns in the each group of rows into a corresponding compression unit (CU) of a fixed number of entries.

4. The method of claim 3, wherein the heap file includes a sequence number of the sequence numbers indicating a first row in the group of rows.

5. The method of claim 3, wherein the heap file storing the group of rows includes or is associated with a CU descriptor pointing to a corresponding CU storing the group of rows.

6. The method of claim 5, wherein the CU descriptor includes a deletion bitmap field for flagging deleted rows, where each bit represents a row in the CU.

7. The method of claim 5, wherein the CU descriptor indicates a total number of rows in the corresponding CU.

8. The method of claim 1, wherein the first storage format is the CS storage format and the second storage format is the RS storage format; with the method further comprising:
before storing the data, determining a sequence of rows of the data in order to improve compression efficiency at the CS storage format.

9. The method of claim 1, wherein:
the data is from a data table comprising a third sequence of rows; and
the method further comprises:
compressing a plurality of columns in the third sequence of rows of the data table into a compression unit (CU) for the CS storage format, wherein the third sequence of rows is in an order suitable for the CS storage format; and
inserting rows of the third sequence of rows into a heap file for the RS storage format, wherein the rows of the third sequence of rows in the heap file are ordered in the RS storage format in the order that is suitable for the CS storage format.

10. The method of claim 9, further comprising repeating the compressing and inserting until all rows in the data table are stored in the CS storage format and the RS storage format.

11. A network component for managing storage of a primary database and a replica database, the network component comprising:
at least one processor coupled to a memory; and
a non-transitory computer readable storage medium storing programming for execution by the at least one processor, the programming including instructions to:
store data in a first storage format at the primary database of a first processing node, the first processing node comprising a first central processing unit (CPU) and a first memory, the primary database being queryable using database queries, the first storage format being one of a row store (RS) storage format or a column store (CS) storage format, and the data being arranged in a first sequence of rows at the primary database;
store the data in a second storage format at the replica database at a second processing node separate from the first processing node, the second processing node comprising a second CPU and a second memory, the replica database being queryable using database queries, the second storage format being the other of the RS storage format or the CS storage format, the data being arranged in a second sequence of rows at the replica database, wherein the data is stored in the first sequence of rows in the first storage format at the primary database and in the second sequence of rows in the second storage format at the replica database such that the primary database and the replica database each store a copy of the data in different storage formats that is queryable;
synchronize the data between the primary database and the replica database by aligning the first sequence of rows with the second sequence of rows according to sequence numbers assigned to the first sequence of rows and the second sequence of rows;
generate a query plan to execute a single database query on the data according to a type of the single database query, with the query plan comprising a first query function to be executed according to the first storage format and a second query function to be executed according to the second storage format; and
execute the single database query on the data according to the query plan by accessing the copy of the data at the primary database of the first processing node according to the first storage format to execute the first query function, and accessing the copy of the data at the replica database of the second processing node according to the second storage format to execute the second query function.

12. The network component of claim 11, wherein the first storage format is the RS storage format and the second storage format is the CS storage format; with the programming further including instructions to:
before storing the data, determine a sequence of rows of the data in order to improve compression efficiency at the CS storage format.

13. The network component of claim 12, wherein:
the instructions to store the data in the primary database include instructions to store each group of rows in a plurality of groups of rows in the data into a corresponding heap file of a fixed length; and
the instructions to store the data in the replica database include instructions to store a fixed number of columns in the each group of rows into a corresponding compression unit (CU) of a fixed number of entries.

14. The network component of claim 13, wherein a heap file includes a sequence number of the sequence numbers indicating a first row in a corresponding group of rows.

15. The network component of claim 13, wherein a heap file storing a corresponding group of rows:
includes or is associated with a CU descriptor that points to a corresponding CU storing the group of rows;
includes a deletion bitmap field for flagging deleted rows where each bit represents a row in the CU; and
indicates a total number of rows in the corresponding CU.

16. The network component of claim 11, wherein:
the data is from a data table comprising a third sequence of rows; and
the programming includes instructions to:
compress a plurality of columns in the third sequence of rows of the data table into a compression unit (CU) for the CS storage format, wherein the third sequence of rows is in an order suitable for the CS storage format; and
insert rows of the third sequence of rows into a heap file for the RS storage format, wherein the rows of the third sequence of rows in the heap file are ordered in the RS storage format in the order that is suitable for the CS storage format.

17. The network component of claim 16, wherein the programming further includes instructions to repeat the compress and insert operations until all rows in the data table are stored in the CS storage format and the RS storage format.

18. A non-transitory computer-readable medium storing computer instructions that, when executed by one or more processors, cause the one or more processors to perform operations comprising:
storing data in a first storage format at a primary database at a first processing node, the first processing node comprising a first central processing unit (CPU) and a first memory, the primary database being queryable using database queries, the first storage format being one of a row store (RS) storage format or a column store (CS) storage format, and the data being arranged in a first sequence of rows at the primary database;
storing the data in a second storage format at a replica database at a second processing node separate from the first processing node, the second processing node comprising a second CPU and a second memory, the replica database being queryable using database queries, the second storage format being the other one of the RS storage format or the CS storage format, and the data being arranged in a second sequence of rows at the replica database, wherein the data is stored in the first sequence of rows in the first storage format at the primary database and in the second sequence of rows in the second storage format at the replica database such that the primary database and the replica database each store a copy of the data in different storage formats that is queryable;
synchronizing the data between the primary database and the replica database by aligning the first sequence of rows with the second sequence of rows according to sequence numbers assigned to the first sequence of rows and the second sequence of rows;
generating a query plan to execute a database query on the data according to a type of the database query, with the query plan comprising a first query operation to be executed according to the first storage format and a second query operation to be executed according to the second storage format; and
executing the database query on the data according to the query plan by accessing the copy of the data at the primary database of the first processing node according to the first storage format to execute the first query operation, and accessing the copy of the data at the replica database of the second processing node according to the second storage format to execute the second query operation.

19. The non-transitory computer-readable medium of claim 18, wherein:
the data is from a data table comprising a third sequence of rows; and
the operations further comprise:
compressing a plurality of columns in the third sequence of rows of the data table into a compression unit (CU) for the CS storage format, wherein the third sequence of rows is in an order suitable for the CS storage format; and
inserting rows of the third sequence of rows into a heap file for the RS storage format, wherein the rows of the third sequence of rows in the heap file are ordered in the RS storage format in the order that is suitable for the CS storage format.

* * * * *